United States Patent
Bhimani et al.

(10) Patent No.: US 12,124,510 B2
(45) Date of Patent: Oct. 22, 2024

(54) METHODS AND SYSTEMS FOR EFFICIENT DATA IMPORTATION FOR DATA VISUALIZATION

(71) Applicant: T-Mobile Innovations LLC, Overland Park, KS (US)

(72) Inventors: Jeny Bhimani, Bothell, WA (US); Taha Lahrichi, Bellevue, WA (US); Farrah Young Lee, Bellevue, WA (US); James Byung Ha No, Covington, WA (US)

(73) Assignee: T-Mobile Innovations LLC

( * ) Notice: Subject to any disclaimer, the term of this patent is extended or adjusted under 35 U.S.C. 154(b) by 0 days.

(21) Appl. No.: 17/741,218

(22) Filed: May 10, 2022

(65) Prior Publication Data

US 2023/0367811 A1    Nov. 16, 2023

(51) Int. Cl.
  *G06F 16/838*    (2019.01)
  *G06F 16/81*    (2019.01)
  *G06F 16/909*    (2019.01)

(52) U.S. Cl.
  CPC ............ *G06F 16/838* (2019.01); *G06F 16/81* (2019.01); *G06F 16/909* (2019.01)

(58) Field of Classification Search
  CPC ....... G06F 16/838; G06F 16/81; G06F 16/909
  See application file for complete search history.

(56) References Cited

U.S. PATENT DOCUMENTS

| 8,185,103 | B2* | 5/2012 | Alfano | H04W 48/04 455/433 |
| 10,909,120 | B1* | 2/2021 | Mohamad | G06F 16/24554 |
| 11,789,986 | B1 | 10/2023 | Bhimani et al. | |
| 11,934,430 | B2 | 3/2024 | Bhimani et al. | |
| 2008/0294678 | A1* | 11/2008 | Gorman | G06Q 10/10 707/999.102 |
| 2010/0332593 | A1* | 12/2010 | Barash | H04L 63/145 709/203 |
| 2018/0004211 | A1 | 1/2018 | Grimm et al. | |
| 2019/0129844 | A1* | 5/2019 | Zhang | G06F 16/182 |
| 2019/0156566 | A1 | 5/2019 | Chen et al. | |
| 2019/0277640 | A1 | 9/2019 | Nelapati et al. | |

(Continued)

OTHER PUBLICATIONS

Razavi, N, Johns, M. Processing Geospatial Data at Scale with Databricks, Dec. 5, 2019 (Year: 2019).*

(Continued)

*Primary Examiner* — Stephen S Hong
*Assistant Examiner* — Carl E Barnes, Jr.

(57) ABSTRACT

A method comprises storing, at a storage bucket of the communication system, an import file received from a client application at a workstation, wherein a user defined function of the communication system is triggered to execute when the import file is received from the workstation, retrieving, by the user defined function, the import file from the storage bucket, processing, by the user defined function, the import file to obtain a geospatial file, storing the geospatial file in a cloud database of the communication system, fetching, by an application of the communication system, the geospatial file from the cloud database, and generating, by a visualization application of the communication system, the multilayer geographical virtualization based on the geospatial file fetched from the cloud database.

20 Claims, 8 Drawing Sheets

(56) References Cited

U.S. PATENT DOCUMENTS

| | | |
|---|---|---|
| 2019/0347820 A1 | 11/2019 | Golinsky et al. |
| 2020/0026720 A1 | 1/2020 | Liu et al. |
| 2021/0233722 A1 | 8/2021 | Pellegrini et al. |
| 2021/0293547 A1 | 9/2021 | Kitaura |
| 2021/0392314 A1 | 12/2021 | Nims et al. |
| 2022/0065991 A1 | 3/2022 | Zhang et al. |
| 2022/0144305 A1 | 5/2022 | Ren et al. |
| 2022/0146632 A1 | 5/2022 | Laverne et al. |
| 2022/0175609 A1 | 6/2022 | Ding et al. |
| 2022/0206491 A1 | 6/2022 | Chung et al. |
| 2022/0335842 A1 | 10/2022 | Thiyagarajan et al. |
| 2023/0050467 A1 | 2/2023 | Govardhanam |
| 2023/0418847 A1 | 12/2023 | Bhimani et al. |
| 2024/0020322 A1 | 1/2024 | Bhimani et al. |

OTHER PUBLICATIONS

Notice of Allowance dated May 1, 2024, U.S. Appl. No. 18/463,260, filed Sep. 7, 2023.

Notice of Allowance dated Jun. 13, 2023, U.S. Appl. No. 17/840,603, filed Jun. 14, 2022.

Notice of Allowance dated Nov. 9, 2023, U.S. Appl. No. 17/865,351, filed Jul. 14, 2022.

Bhimani, Jeny, et al., "Methods and Systems for Querying Data Within a Geographical Boundary Using a Query Tool," filed Sep. 7, 2023, U.S. Appl. No. 18/463,260.

Bhimani, Jeny, et al., "Visualization of Elevation Between Geographic Locations Using Segmented Vectors Based on Ground and Clutter Elevation Data," filed Jul. 14, 2022, U.S. Appl. No. 17/865,351.

Bhimani, Jeny, et al., "Methods and Systems for Querying Data Within a Geographical Boundary Using a Query Tool," filed Jun. 14, 2022, U.S. Appl. No. 17/840,603.

* cited by examiner

METHODS AND SYSTEMS FOR EFFICIENT DATA IMPORTATION FOR DATA VISUALIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In telecommunications, the radio coverage of a carrier network refers to a geographic area where a communication device may communicate with a cell site of a carrier, for example, with a signal strength above a threshold. Within this geographic area, a communication device may be able to complete a call using the carrier network or a partner network. Radio coverage may depend on several factors, such as physical obstacles, radio frequencies, and perhaps most importantly, the sensitivity and transmit efficiency of consumer equipment. Different carrier networks may have different coverage at various geographic locations. For example, a carrier network may have great signal strength in larger cities, and poor signal strength in more rural areas.

Carrier companies may establish retail stores at various locations throughout the country, without necessarily considering the retail coverage in the area at which the retail store is located. For example, a carrier company may arbitrarily position retail stores throughout various locations in the suburbs of larger cities. However, some of these locations may have little to no radio coverage of the carrier network. As a result, those particular retail stores may not receive many customers. In addition, the customers that purchase devices from those retail stores likely live proximate to the retail store, in an area that also has little to no coverage. In this case, the customers often return the device to the retail store shortly after purchase. Therefore, carrier retail stores in areas with little to no radio coverage are often unsuccessful and unprofitable.

SUMMARY

In an embodiment, a method performed by a system to generate a multilayer geographical virtualization is disclosed. The method comprises receiving, by an application of the system, a request to generate the multilayer geographical virtualization based on a first import file formatted as a Shapefile and a second import file formatted as a keyhole markup language (KML) file, wherein the first import file and the second import file are first stored at a storage bucket in a cloud system, wherein after the first import file and the second import file are stored at the storage bucket, a user defined function at the cloud system processes the first import file to obtain a first geospatial file and processes the second import file to obtain a second geospatial file, and wherein the user defined function transmits the first geospatial file and the second geospatial file to a cloud database for storage, fetching, by the application, the first geospatial file from the cloud database, generating, by a visualization application of the system, a first layer of the multilayer geographical virtualization based on the first geospatial file fetched from the cloud database, fetching, by the application, the second geospatial file from the cloud database, adding, by the visualization application, a second layer to the multilayer geographical virtualization based on the second geospatial file fetched from the cloud database, and transmitting, by the visualization application to a workstation, the multilayer geographical virtualization for display at the workstation.

In another embodiment, a method performed by a communication system to generate a multilayer geographical virtualization is disclosed. The method comprises storing, at a storage bucket of the communication system, an import file received from a client application at a workstation, wherein a user defined function of the communication system is triggered to execute when the import file is received from the workstation, retrieving, by the user defined function, the import file from the storage bucket, processing, by the user defined function, the import file to obtain a geospatial file, storing the geospatial file in a cloud database of the communication system, fetching, by an application of the communication system, the geospatial file from the cloud database, generating, by a visualization application of the communication system, the multilayer geographical virtualization based on the geospatial file fetched from the cloud database, and transmitting, by the visualization application to the workstation, the multilayer geographical virtualization for display at the workstation.

In yet another embodiment, a system is disclosed. The system comprises at least one processor, at least one non-transitory memory, a storage bucket configured to store an import file received from a client application at a workstation, a user defined function triggered to execute when the import file is received from the workstation, an application stored in the at least one non-transitory memory, and a visualization application in the at least one non-transitory memory. The user defined function is stored in the at least one non-transitory memory, which when executed by the at least one processor, causes the at least one processor to be configured to retrieve the import file from the storage bucket, process the import file to obtain a geospatial file, and store the geospatial file in a cloud database of the system. The application, when executed by the at least one processor, causes the at least one processor to be configured to fetch the geospatial file from the cloud database. The visualization application, which when executed by the at least one processor, causes the at least one processor to be configured to generate a multilayer geographical virtualization based on the geospatial file fetched from the cloud database, and transmit the multilayer geographical virtualization for display at the workstation.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
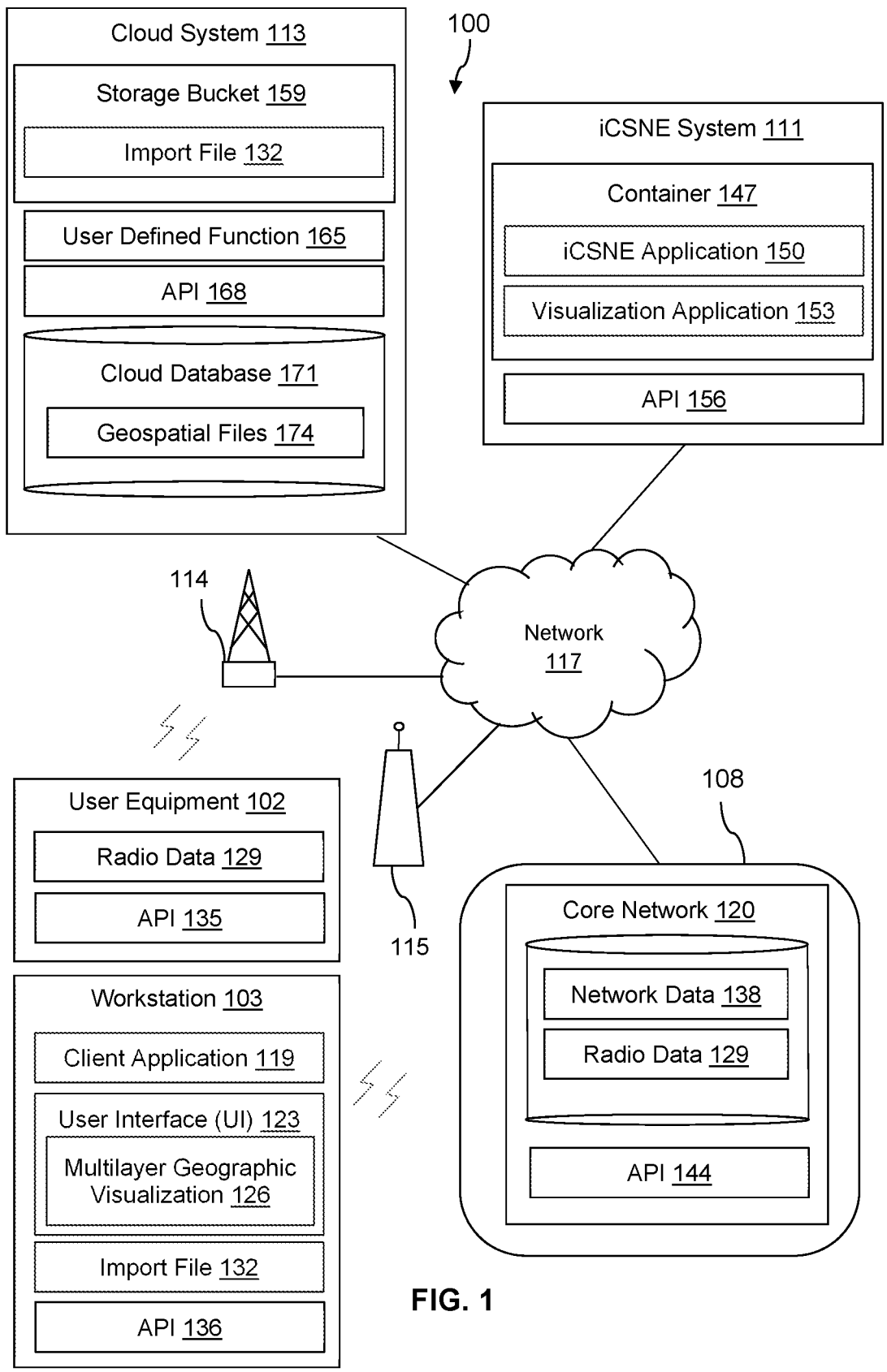
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, a carrier company (i.e., a telecommunications service providing company) may establish retail stores in areas with little to no radio coverage of the carrier network, and these retail stores are often unsuccessful and unprofitable, resulting in large amounts of wasted investments. For example, each retail store may be associated with a $50 million cost value, and this cost value may include the capital investments to establish retail store and/or an expected revenue generation of the retail store. When such a retail store underperforms, some significant fraction of this cost value may be lost. At least some of these underperforming stores are likely to be located in areas where the carrier network is not adequately providing radio coverage. Therefore, to some extent, it could have been expected that these retail stores would not attract customers in such low radio coverage areas.

To better understand the reasoning behind certain retail store failures and to better determine the locations for potential new retail stores, an Interactive Corporate Strategy and Network Experience (iCSNE) platform has been developed. The iCSNE platform may be a visualization tool that provides many features for assisting decisions that may be made based on the radio coverage of the carrier network at various geographic areas. The iCSNE platform may be implemented by an iCSNE system, which may include a set of servers with storage, processing, and communication capabilities to provide the services offered by the platform. The iCSNE system may either be included in a core network of a carrier network, included in a cloud system communicating with the carrier network, or external to the carrier network and/or the cloud system.

The iCSNE system may generate multilayer geographic visualizations, such as a map, to illustrate carrier network radio coverage at one or more geographic areas. For example, the multilayer geographic visualization may include different shades of a color at different geographic locations on the visualization based on the radio coverage or signal strength of the carrier network at that location. For example, a darker shade of the color may indicate better radio coverage than a lighter shade (or vice versa), and white may indicate that no radio coverage is provided at that location. The multilayer geographic visualization may also indicate types of cell sites (e.g., a generation of wireless technology supported by the cell site) within the geographic areas. The multilayer geographic visualization may also illustrate a type of coverage at specific locations within the geographic areas. For example, the type of coverage may indicate the specific signal strength at a location, bandwidth availability, or an antenna pattern of radio coverage at the location. In some cases, the multilayer geographic visualization of a geographic area may also include a comparison against a coverage map of one or more competitor telecommunications service providing companies, which may be publicly available. The multilayer geographic visualization may also indicate the existing retail stores within the geographic area. As should be appreciated, the multilayer geographic visualization may illustrate carrier network radio coverage in a variety of different ways, which should not be limited herein.

The multilayer geographic visualization may be generated based on various types of radio coverage data, for example, stored at the carrier network, in which the carrier network received the radio coverage data from various different sources. For example, the radio coverage data may include signal strength, bandwidth, latency, throughput, supported wireless technologies, types of devices communicating with the network element, antenna patterns, etc. The radio coverage data may include network data collected from network elements in the carrier network, radio data collected from UEs that are registered with the carrier network, publicly available data regarding radio coverage of the carrier network, partner network, or competitor network, or any other possible source of radio coverage data.

One or more network elements in the carrier network may periodically, or upon a predetermined schedule, collect radio coverage data based on communications with registered UEs, and send the collected radio coverage data to the carrier network as the network data. The UEs may also collect radio coverage data using, for example, a carrier application installed at the UE. As the UE travels with the user across various geographic locations, the UE may map a signal strength at a particular location to the location itself, and log this mapping as radio data. The UE may periodically, or upon a predetermined schedule, send the collected radio data to the carrier network. The publicly available data may be openly available on the Internet. For example, the publicly available data may include estimated coverage maps for the carrier network, partner network, or competitor network.

The iCSNE system may be communicatively coupled to the carrier network to access the radio coverage data to generate multilayer geographic visualizations. In some cases, the radio coverage data obtained from the various different sources may be referred to as layers. The iCSNE system may generate the multilayer geographic visualization, using the radio coverage data from the various different sources, in which the data obtained from each source is a different layer on the multilayer geographic visualization. For example, the network data received from the network may be displayed on the multilayer geographic visualization as a first layer, the radio data received from the UEs may be displayed on the multilayer geographic visualization as a second layer, and the publicly available data may be displayed on the multilayer geographic visualization as a third layer. As further described, other layers, generated based on source data uploaded by a user of the workstation in an import file, may also be displayed or superimposed on the multilayer geographic visualization. In some cases, the iCSNE system may retrieve each layer of data separately and render the layers individually, and superimpose the layers to render the final multilayer geographic visualization.

The iCSNE system may send the multilayer geographic visualization to one or more workstations running an iCSNE client application for display at the workstation. A workstation may be, for example, a desktop computer, laptop computer, tablet computer, notebook computer, or any other type of computer. A workstation may be used by a carrier technologist or employee of the carrier, and the workstation may execute a proprietary and restriction visualization tool, for example, using a client application. A carrier employee or technologist working for the carrier (also sometimes referred to herein as simply a "carrier technologist") of the workstation may use the multilayer geographic visualization to better understand and act upon the low performance of already built retail stores (e.g., avoid reprimanding store managers for underperformance, confirm the decision to close the retail store instead of waiting for performance improvement, etc.). The multilayer geographic visualization may also be used to determine locations for potential new retail stores in areas with, for example, high signal strength and a high population density. The multilayer geographic visualization may also be used to determine locations for potential new cell sites of the carrier network based on, for example, locations with little to no signal strength having greater than a threshold population density. To this end, the multilayer geographic visualization may display an indication of the population density of various locations within the geographic area being displayed, to assist in the foregoing determinations.

In this way, additional carrier technologists may import new layers of data to the iCSNE system, in which the data may include various types of data, such as, for example, radio coverage data or network attributes at various locations with regard to radio coverage, retail store data, etc. In this way, as the iCSNE system receives additional layers of data, the iCSNE system is enabled to generate enhanced and highly accurate multilayer geographic visualizations with a rich visualization display, which can be processed and manipulated using an interface at a workstation.

To enable disparate carrier technologists to send data to the iCSNE system, the iCSNE system utilized a layer importation technique, which proved to be limiting and resulted in frequent failures of data uploads. The layer importation technique involved a carrier technologist first uploading an import file on a client application running at the workstation to the iCSNE system. An import file may contain data related to geographic locations or geographic features. In some cases, the data in the import files may be related to the carrier network and/or telecommunications features. For example, the data in the import file may include a location of telecommunication components of the network (i.e., without performance data), data which is radio performance related, and data that is business related (e.g., retail store revenue). In other cases, it should be appreciated that an import file may not necessarily relate to telecommunications features, but instead may contain broad categories of other type of data, including business data, personal data, or otherwise.

The formats or types of files that are permitted to be uploaded may include a Shapefile, a TAB file, a keyhole markup language (KML) file, or a comma separate value (CSV) file. In some cases, other types of files may be permitted to be uploaded to the iCSNE system as well, when the files may be used to generate the multilayer geographic visualizations. A Shapefile may be a format for storing geometric location and attribute information of geographic features, a TAB file may be tab-delimited text or data file containing tab-separated values, a KML file may be used to display geographic data in an Earth browser, and a CSV file may be a plain text file that contains a list of data using a comma to separate values. Of these permitted file types, certain file types (e.g., KML files and a Shapefiles) may be more complex, having large file sizes, and sometimes including multiple sub-files. Regardless of the type of files, the goal of the iCSNE platform is to enable multiple users to upload geographic data in the form of import files, such that this data may be subsequently accessed and visually displayed, sometimes arbitrarily together, at the workstation upon request.

Once the iCSNE system receives the import file, the iCSNE system may store the import file in software a container, such as a DOCKER container, which stores an actual iCSNE application and a runtime environment and software for the iCSNE application. The container may include other data used to run the iCSNE application as well, such as, for example, tools, libraries, and settings. The iCSNE application may execute in the container to process the import file into a geospatial type of data set or file, and then store the geospatial file in a database. The database may be located in a cloud system external to the iCSNE system or within the iCSNE system. The iCSNE system may then fetch the geospatial file from the cloud database upon, and a visualization application at the iCSNE system or within the container may process (e.g., render) the geospatial file to obtain a human viewable visualization format to generate the multilayer geographic visualization. Alternatively, the visualization application may transmit the geospatial file to a geospatial server, such as GEOSERVER, to process the geospatial file into a human viewable visualization format to generate the multilayer geographic visualization.

However, this layer importation technique proved to include several technical problems, due at least partially to the dependence on the container. The foregoing layer importation technique relied on all the processing and storage of the iCSNE platform to be held at the container. However, the container by itself is limited in processing and storage capacity. For example, the container is not able to receive and store large files above a certain threshold megabyte (MB) size. However, as mentioned above, some of the file types for the import files are complex with large file sizes that exceed the threshold size of the container. For example, a Shapefile may be implemented as four separate files, and the four separate files could not be uploaded at once into the container since the files often exceed the threshold size.

Therefore, most import files simply could not be uploaded to the iCSNE system using the foregoing layer importation technique. The container in the iCSNE system, by itself, is not capable of performing the processing and storage of all of the data (e.g., large import flies) used to generate the most optimal versions of visualizations. In an addition, the container was not scalable in the sense that the size of the container was limited, and thus the container itself could not store much data aside from the iCSNE application and associated dependencies. As more data was imported to the container, the container would be overloaded, limiting the processing capabilities of the container and thus, the iCSNE application as well.

Disclosed herein are embodiments directed to a technical solution to the foregoing technical problems, by providing an enhanced and far more efficient layer importation technique. In some embodiments, a portion of the storage and functioning provided by the container may be migrated to a cloud system, to reduce the load at the container and more efficiently store and process the import file to generate multilayer geographic visualizations. By reducing the processing load at the container in the iCSNE system, the iCSNE system may support more complex import files, such as Shapefiles, and is scalable to support as much data being imported as desired. In particular, the embodiments disclosed herein enable the handling of import files that are at least four times the size of the threshold size of the layer importation technique discussed above.

In an embodiment, a carrier technologist operating the workstation may upload any of the permitted types of import files via a user interface (UI) on a display using, for example, a single click. An iCSNE client application running at the workstation, used to access the visualization tool used to display the multilayer geographic visualization, may send the import file to a storage bucket located in a cloud system. The use of a storage bucket at the cloud system instead of the container at the iCSNE system to store the import files enables larger files to be uploaded, while providing scalability when needed. The storage bucket may be managed by an object storage service offering scalability, data availability, security, and performance at the cloud system. The storage bucket may be used to organize data and configure fine-tuned access controls to meet specific business, organization, and compliance requirements. For example, one storage bucket may store up to 5 terabytes of data in size, which is far more than the storage limitations of the container. The storage bucket may also include capabilities that may have not otherwise been permitted in the container. For example, the storage bucket may include capabilities for appending metadata tags to data, move and store data across different storage classes, configure and enforce data access controls, secure data against unauthorized users, run big data analytics, monitor data, and view storage usage and activity trends across an organization.

When an import file is uploaded into the storage bucket, a user defined function (UDF) at the cloud server may be triggered to execute using the import file. The UDF is a function created by a user of the cloud system for a particular purpose, which may receive input data, and then process the input data to generate output data. For example, the UDF may be created by a carrier technologist working for the carrier and operating a workstation permitted to access the visualization tool that displays the multilayer geographic visualization. For example, the import file may be an input into the UDF, and the UDF may convert the import file into a geospatial file and/or one or more geospatial data sets. The UDF may output the obtained geospatial file and/or geospatial data sets, and then send the geospatial file and/or geospatial data sets to a cloud database for storage. The cloud database may be part of the cloud system, or stored in a separate data center/data store external to the cloud system. Subsequently, the iCSNE system may receive a request of a multilayer geographic visualization including a layer corresponding to the import file. In this case, the iCSNE application, which is still in the container of the iCSNE system, may retrieve the geospatial file and/or geospatial data sets from the cloud database.

In one embodiment, a visualization application at the iCSNE system, and possibly within the container, may process the geospatial file and/or geospatial data sets to render the multilayer geographic visualization in a human viewable visualization format. In another embodiment, the visualization application may publish the geospatial file and/or geospatial data sets into a geospatial server, such as GEOSERVER, such that the geospatial server renders the multilayer geographic visualization in a human viewable visualization format. Either the iCSNE system or the geospatial server then sends the multilayer geographic visualization to the workstation for display at the workstation.

In this way, the multilayer geographic visualization may include multiple visualization layers graphically displayed together (e.g., superimposed upon one another) in the form of a single, easy to view visualization. For example, the multilayer geographic visualization may display a first layer generated based on a first import file formatted as a Shapefile and received from a first user, a second layer generated based on a second import file formatted as a KML file and received from a second user, a third layer generated based on a third import file formatted as a TAB file and received from a third user, and a fourth layer generated based on a fourth import file formatted as a CSV file and received from a fourth user. As described above, each of these different import files may be directed to any type of data, so long as the data is associated with geographic locations or geographic features. According to foregoing resource efficient layer important technique, the storage bucket may store each of these different import files from different users, and then the UDF may subsequently process the import files to translate and normalize the data from the import files into one or more geospatial files. The geospatial files may then be stored at the cloud database, and fetched by the iCSNE system, upon request, to generate the multilayer geographic visualization using the geospatial files created using the UDF.

To this end, the iCSNE system enables multiple disparate users to import multiple layers of data through the use of the foregoing resource efficient layer importation technique. In this way, multiple disparate users may access the data uploaded from different users and obtained from different sources, to intermix the data into a single multilayer geographic visualization. A rich multilayer geographic visualization including numerous layers, including data from different import files from different users, may provide valuable new insights relating to data correlations, which may have never been analyzed before in such a user-friendly manner.

The embodiments disclosed are advantageous for various reasons. By storing the import files in the storage bucket at the cloud system instead of at the container in the iCSNE system, the system becomes far more scalable and enables users to upload import files with more detailed data, which ultimately results in a far more rich and accurate multilayer geographic visualization. In addition, as mentioned, this system uses a UDF at the cloud system to process the import file to obtain a geospatial file that is then stored at the cloud system, instead of using an application at the container in the iCSNE system. In this way, the complex process of converting and normalizing the data from different sources and the import files received from different users may be performed in a far more computationally efficient manner, since the load is taken off the iCSNE system itself. The cloud system may take the burden of the complex processing involved in obtaining data from various different types of sources, which have locational elements, and then translating the data into a common geospatial frame of reference and format. In addition, by retaining some of the processing of the iCSNE system at the container (e.g., the actual generation of the multilayer geographical visualization), the iCSNE system is able to maintain control of the primary functions of the iCSNE platform. The applications at the container of the iCSNE system may be enabled to maintain full control over the accessing and combining of data from different sources, while operating far more resource efficiently using data that has been migrated to the cloud system and using functions that may be more efficiently performed at the cloud system. The embodiments disclosed herein therefore allow the creation of compatible geospatial layers of information, which allows the further combination of those layers (sometimes by simple overlay but possibly also by interactive combination of the underlying data from multiple sources) into the multilayer geographic visualization.

In addition, the storage bucket, the UDF, and the cloud database in the cloud system are programmed to work together seamlessly with a very low latency when, for example, the storage bucket, the UDF, and the cloud database are stored in the same data center. In addition, the use of the UDF at the cloud system is such that the carrier is only charged for execution volume, such that when the UDF is not running, no platforming fees are accruing. In this way, the carrier only accrues fees at the cloud system when the UDF actually runs, and based on the storage space used in the storage bucket and/or the cloud database. Therefore, the distribution of the processing across multiple components in the cloud system, as opposed to relying solely on the container, may reduce the load at the iCSNE system and reduces the end cost to the carrier.

In addition, the embodiments disclosed herein enable a far more efficient and effective method for importing layers into the iCSNE system to generate multilayer geographic visualizations. The entire processing is done on the back end of the system, such that the carrier technologist is completely unaware of how the import file is being seamlessly converted into a visualization using a cloud system and an iCSNE system. The embodiments disclosed herein also enable the importation of larger, more complex files with richer data, resulting in the generation of more accurate and precise multilayer geographic visualizations. The embodiments disclosed herein also improve the efficiency of the processing involved to produce a visualization from the import file, by using the UDF and the storage bucket at the cloud system, instead of a container locally at the iCSNE system.

Turning now to FIG. 1, a communication system 100 is described. The system 100 comprises a UE 102, a workstation 103, a carrier network 108, an iCSNE system 111, a cloud system 113, a cell site 114, a home network device 115, and a network 117. The UE 102 may be communicatively coupled to the carrier network 108, network 117, iCSNE system 111, and the cloud system 113 via the cell site 114 or the home network device 115. The workstation 103 may also be communicatively coupled to the carrier network 108, network 117, iCSNE system 111, and the cloud system 113 via the cell site 114 or the home network device 115.

The UE 102 may be a cell phone, a mobile phone, a smart phone, a personal digital assistant (PDA), an Internet of things (IoT) device, a wearable computer, a headset computer, a laptop computer, a tablet computer, a notebook computer, a medical monitoring device, a vehicle computer, etc. The UE 102 may store radio data 129, which may be collected using, for example, a carrier application running at the UE 102. The radio data 129 may include mappings between a particular geographic location and radio coverage data at that geographic location (e.g., radio coverage, signal strength, bandwidth, etc.). The UE 102 may also include one or more application programming interfaces (APIs) 135, which may be used to communicate with the carrier network 108, the iCSNE system 111, and/or the cloud system 113. For example, the UE 102 may collect the radio data 129 and transmit the radio data 129 to the core network 120 using API 135. The UE 102 may belong to a subscriber of the carrier network, registered with the carrier network.

The workstation 103 may be, for example, a desktop computer, laptop computer, tablet computer, notebook computer, or any other type of computer. A workstation 103 may be used by a carrier technologist or employee of the carrier (as opposed to a subscriber of the carrier network), and the workstation 103 may run a proprietary and restriction visualization tool, for example, using a client application 119. The client application 119 may correspond to the iCSNE system 111 and run a client side of the iCSNE platform. The workstation 103 may include a UI 123, displayed on a display of the workstation 103 with other data from the client application 119. A carrier technologist operating the workstation 103 may interact with the client application 119 using the UI 123. The UI 123 may display the multilayer geographic visualization 126, which as described above, may be a visualization (e.g., a map) indicating radio coverage data, cell site locations, retail store locations, and any other data related to the carrier in relation to a geographic area. The workstation 103 may store and/or generate import files 132, which may be any file including data that may be used to generate multilayer geographic visualizations 126. For example, an import file 132 may be a Shapefile, a TAB file, a KML file, or a CSV file. The workstation 103 may also include one or more APIs 136, which may be used to communicate with the carrier network 108, the iCSNE system 111, and/or the cloud system 113.

The home network device 115 may be a modem, wireless router, and/or gateway configured to provide Internet access to UE 102 and/or workstation 103, for example, via the carrier network 108 and network 117. For example, the home network device 115 may be a wireless access point, through which the UE 102 and/or workstation 103 may access the Internet, the carrier network 108, the iCSNE system 111, and/or the cloud system 113. The cell site 114 provides the UE 102 and/or workstation 103 a wireless communication link to the carrier network 108, network 117, the iCSNE system 111, and/or the cloud system 113 according to a 5G, a long term evolution (LTE), a code division multiple access (CDMA), or a global system for mobile communications (GSM) wireless telecommunication protocol. The network 117 may be one or more private networks, one or more public networks, or a combination thereof. While FIG. 1 shows the carrier network 108, the iCSNE system 111, and the cloud system 113 as being separate from the network 117, it should be appreciated that, in some embodiments, at least a portion of the carrier network 108, the iCSNE system 111, and the cloud system 113 may be part of the network 117.

The carrier network 108 may be a network including a radio access network (RAN) and a core network 120. The RAN may include the access network containing the radio elements of a cell network, and the core network 120 may include the elements that manage the subscriber information, call setup and routing, and related system supports. In an embodiment, the core network 120 may be an evolved packet core (EPC) core network. The core network 120 may be a configured to implement a 5G, a LTE, a CDMA, or a GSM wireless telecommunication protocol. In one embodiment, the core network 120 may be a 3rd Generation Partnership Project (3GPP) Evolved Packet System (EPS).

The core network 120 may store radio coverage data received from various different sources. In an embodiment, the radio coverage data may include a network data 138 and radio data 129. The network data 138 may include radio coverage data or network attribute data related to the coverage provided by the carrier network 108 at one or more network elements within the network 117 and the carrier network 108. The radio coverage data or network attribute data included in the network data 138 may include, for example, signal strength, bandwidth (e.g., frequency bands), latency, throughput, supported wireless technologies, types of devices communicating with the network element, antenna patterns, etc. One or more network elements in the network 117 and/or carrier network 108 may determine or measure the network data 138 for the carrier based on communications with devices registered with the carrier. The network elements may transmit the network data 138 to the core network 120 for storage at the core network 120, or elsewhere within the carrier network 108, or even external to the carrier network 108.

The radio data 129 may be received from devices registered with the carrier, such as UE 102. The radio data 129 may include the mappings between a particular geographic location and radio coverage data at that geographic location. The core network 120 may store other data received from various other sources and publicly available information.

As described above, the iCSNE system 111 may access the network data 138 and/or the radio data 129 at the core network 120 to create one or more layers in a multilayer geographic visualization 126, which may be sent to the workstation 103. The carrier network 108 may also include one or more APIs 144, which may be used to communicate with the UE 102, workstation 103, iCSNE system 111, and/or cloud system 113. While FIG. 1 shows the core network 120 as storing network data 138 and radio data 139, it should be appreciated that the core network 120 also includes other data and applications not otherwise shown in FIG. 1.

The iCSNE system 111 may include a set of servers with storage, processing, and communication capabilities. While the iCSNE system 111 is shown as separate from the carrier network 108 and the cloud system 113 in FIG. 1, in an embodiment, the iCSNE system 111 may be part of the carrier network 108 and/or the cloud system 113. In another embodiment, the iCSNE system 111 may be external to the carrier network 108 and/or the cloud system 113. The iCSNE system 111 may be communicatively coupled to the UE 102, workstation 103, carrier network 108, network 117, and cloud system 113 via the cell site 114, such that the iCSNE system 111 may communicate with the UE 102, workstation 103, carrier network 108, network 117, and cloud system 113 via the cell site 114.

The iCSNE system 111 may include a software container 147 and one or more APIs 156. The container 147 is a software package including code, files, and dependencies such that one or more applications may execute quickly and reliably when the container 147 is transferred from one computing environment to another. For example, the container 147 may be a DOCKER container. The container 147 may store an iCSNE application 150, a runtime environment, tools, libraries, settings, and other dependencies for the iCSNE application 150. The iCSNE application 150 may be responsible for at least a portion of the processing and communications involved to generate a multilayer geographic visualization 126 using one or more import files 132, network data 138, and/or radio data 129, as described herein. The container 147 may also store a visualization application 153, which may be used to render the multilayer geographic visualization 126, or which may communicate with other systems to generate the multilayer geographic visualization 126. While the visualization application 153 is shown in FIG. 1 as being included in the container 147, in another embodiment, the visualization application 153 may be external to the container 147, but still stored at the iCSNE system 111. Although FIG. 1 shows the iCSNE application 150 and the visualization application 153 as being separate, in an embodiment, the function of the visualization application 153 may be part of the iCSNE application 150. The APIs 156 may also be used to communicate with the UE 102, workstation 103, the carrier network 108, and/or the cloud system 100. It should be appreciated that the iCSNE system 111 may include other components and applications not otherwise shown in FIG. 1.

The cloud system 113 may be implemented as a cloud computing environment and may provide an on-demand availability of data storage and processing resources, without direct active management by the carrier. The cloud system 113 may comprise multiple servers and memories (e.g., databases and data stores), often distributed over multiple locations, with each location being a data center. The cloud system 113 may be owned and operated by a cloud host. The cloud system 113 may offer a pay-as-you-go model, in which users pay for storage and processing resources as they are used, which can help reduce capital expenses for operations.

As shown in FIG. 1, the cloud system 113 includes a storage bucket 159, a UDF 165, one or more APIs 168, and a cloud database 171. The storage bucket 159 may refer to storage space within the storage resources of the data center, and the carrier can increase the space within the storage bucket 159 on an as needed basis. In this way, the storage bucket 159 is far more scalable than the use of the container 147 alone. The storage bucket 159 may store one or more import files 132 received from one or more workstations 103, operated by an employee or technologist of the carrier network 108.

The UDF 165 is a function created by an employee or technologist working for the carrier network 108 using, for example, an SQL expression or JAVASCRIPT code. In some cases, the UDF 165 may not be permitted to be created by a subscriber of the carrier network 108, such as the subscriber behind the UE 102. In these cases, the UDF 165 may only be permitted to be created by an employee or technologist working for the carrier network 108. The UDF 165, when executed, may perform an operation on input data to generate output data. The UDF 165 may be created by the employee or technologist, for example, using the workstation 103. The workstation 103 may send the UDF 165 to the cloud system 113, such that the UDF 165 may then be built into the cloud system 113. The UDF 165 may obtain the import file 132 from the storage bucket 159, and process the import file 132 to generate one or more geospatial files 174, which may include geospatial data sets. The UDF 165 may send the geospatial files 174 to the cloud database 171 for storage. A geospatial file 174 contains geographical information that is associated with a geographic location or position. The file can have a geometric representation such as points, polygons, or lines. The UDF 165 takes the user import file 132 and processes the import file 132 based on a type of the import file 132. As mentioned above, users can import four different file types: Shapefile, TAB, KML, or CSV files. The UDF 165 does a sanity check on the import file 132 to see if the import file 132 is a valid geospatial file 174. Then, the UDF 165 uses a library, such as an ogr2ogr library, to process and write the geospatial file 174 from the cloud database 171.

The cloud database 171 may refer to databases or data stores in the cloud system 113, which are managed using a relational database management system. For example, a cloud database 171 may be a POSTGRES database. The cloud database 171 receives the geospatial files 174 from the UDF 165, and stores the geospatial files 174. While FIG. 1 shows the cloud system 113 as including the cloud database 171, in an embodiment, the cloud database 171 may be external to the cloud system 113, or even stored at a separate cloud system owned by a different cloud host.

A single cloud host, or multiple different cloud hosts, may own and operate the storage buckets 159, UDFs 165, and cloud databases 171 in the cloud system 113. In addition, the storage buckets 159, UDFs 165, and cloud databases 171 may be stored and executed within the same data center or different data centers of the cloud system 113. The APIs 168 may be used to communicate with the UE 102, workstation 103, carrier network 108, and/or the iCSNE system 111. While FIG. 1 shows the cloud system 113 including a single storage bucket 159, UDF 165, and cloud database 171, it should be appreciated that the cloud system 113 may include any number of storage buckets 159, UDFs 165, and cloud databases 171.

Figure 2:
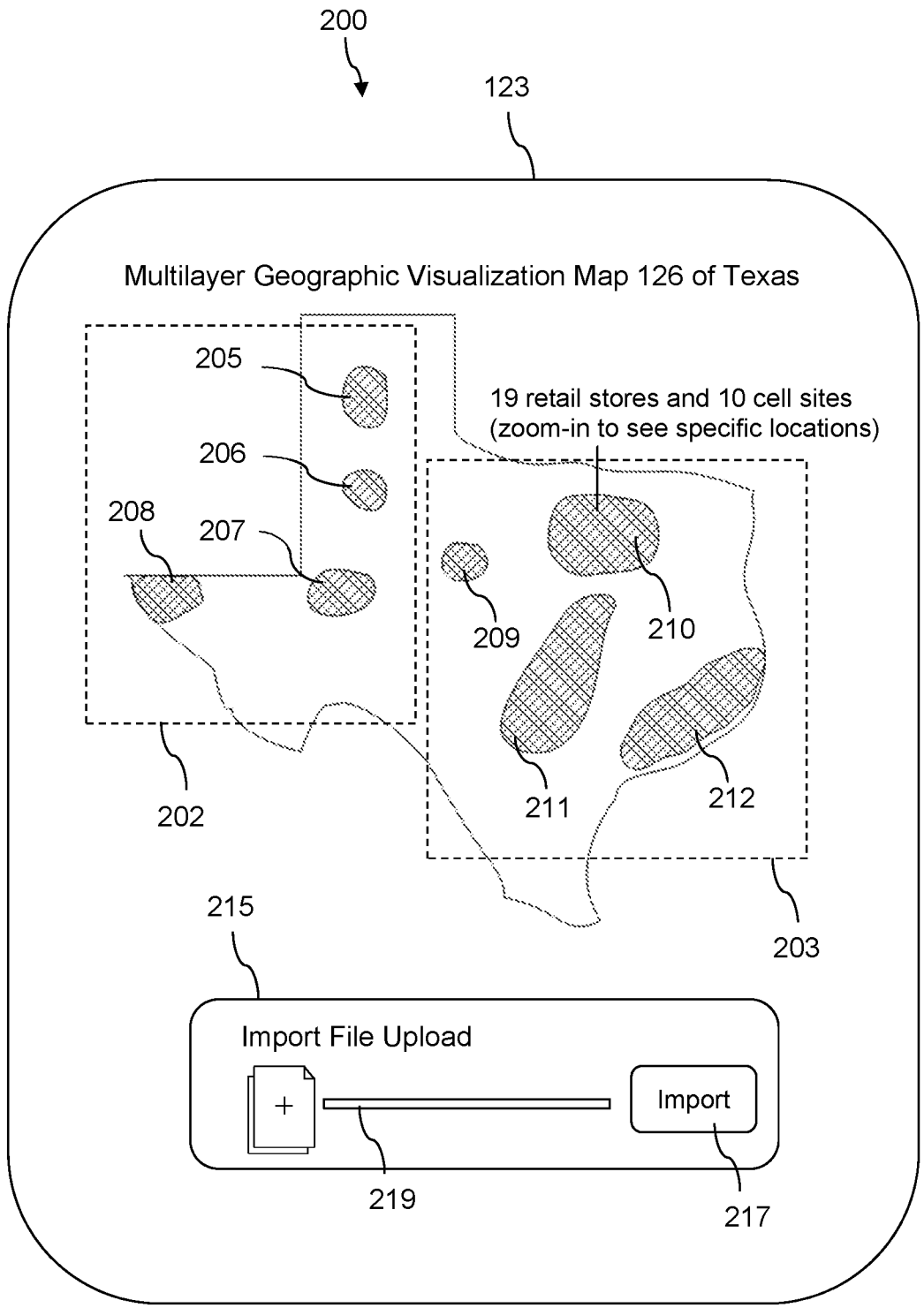
FIG. 2 is an illustration of a user interface screen displayed at a workstation of the communication system of FIG. 1 according to an embodiment of the disclosure.

Turning to FIG. 2, a screen 200 of the UI 123, displayed on the workstation 103, is described. The UI 123 displays an example of a multilayer geographic visualization 126 of the state of Texas. In an embodiment, the client application 119 may generate the UI 123, and may communicate with the carrier network 108, the iCSNE system 111, and/or the cloud system 113 via a series of API calls using the APIs 135, 136, 144, 156, and 168 based on instructions and data received via the UI 123. The client application 119 may also display multilayer geographic visualization 126 on the UI 123.

The multilayer geographic visualization 126 displays geographic areas 205-212 in Texas with radio coverage from the carrier network 108. For example, communications signals being transmitted between a device registered with the carrier and one or more cell sites 114 in the geographic areas 205-212 may have a signal strength above a certain threshold, to be a geographic area 205-212 included in the multilayer geographic visualization 126.

A carrier technologist may zoom in to one of these geographic areas 205-212 to see additional information regarding the geographic area 205-212. For example, the geographic area 210 may represent the Dallas/Ft. Worth metroplex, and a carrier technologist may interact with the UI 123 to zoom into the geographic area 210 to view additional details regarding the geographic area 210. Once geographic area 210 has been zoomed in, the UI 123 may display a second screen including additional details on a zoomed in version of multilayer geographic visualization 126. The additional details may include, for example, the specific locations of the retail stores present in the geographic area 210, specific locations and/or types of the cell sites 114 present in the geographic area 210, types of radio coverage within various areas of the geographic area 210, etc. For example, the geographic area 210 may include different shadings throughout the multilayer geographic visualization 126 to illustrate the signal strength at various locations in the geographic area 210.

As shown in FIG. 2, the UI 123 displays two layers 202 and 203 of data on the multilayer geographic visualization 126. The first layer 202 includes the geographic areas 205-208, and the second layer 203 includes the geographic areas 209-212. The different layers 202 and 203 may be associated with different types of data, sources of data, and/or import files 132. For example, the data used to generate the first layer 202 may include network data 138, while the data used to generate the layer 203 may include the radio data 129. As another illustrative example, the data used to generate the first layer 202 may have originated from an import file 132, which may have been created by a carrier technologist who gathered the radio coverage data describing the geographic areas 205-208. Meanwhile, the data used to generate the second layer 203 may have originated from another import file 132, which may have also been created by a carrier technologist who gathered the radio coverage data describing the geographic areas 209-212. Each carrier technologist may operate a workstation 103 to upload the respective import file 132 to the storage bucket 159, triggering the UDF 165 to process each import file 132 and generate a respective geospatial file 174, until the visualization application 153 creates a layer indicate the data in each import file 132 in a human visualization format. In this way, the storage bucket 159 and the UDF 165 are used with the iCSNE application 150 and the visualization application 153 to superimpose layer 202 with layer 203 and generate the multilayer geographic visualization 126.

As shown in FIG. 2, the UI 123 may also include a UI element 215, which may prompt the carrier technologist at a workstation 103 to select an import file 132 to upload to the storage bucket 159. To this end, the UI element 215 may include an icon that, when selected, opens up a file browser window permitting the carrier technologist to select the import file 132 for import. The UI element 215 may also include an import selectable icon 217 that, when selected, initiates the process of uploading the selected imported file 132 to the storage bucket 159. The UI element 215 may also include an upload status bar 219, which may indicate a percentage by which the import file 132 has been successfully uploaded. In this way, the carrier technologist can simply operate the workstation 103 to select the import file 132 for upload, and select the import selectable icon 217, such that the communication system 100 seamlessly converts, in the background, the data from the import file 132 into a visualization that can be viewed at the workstation 103 as the multilayer geographic visualization 126. According to these embodiments, the process of creating a multilayer geographic visualization 126 from the import file 132 requires little to no user intervention, aside from selecting the import file 132 to import.

Figure 3:
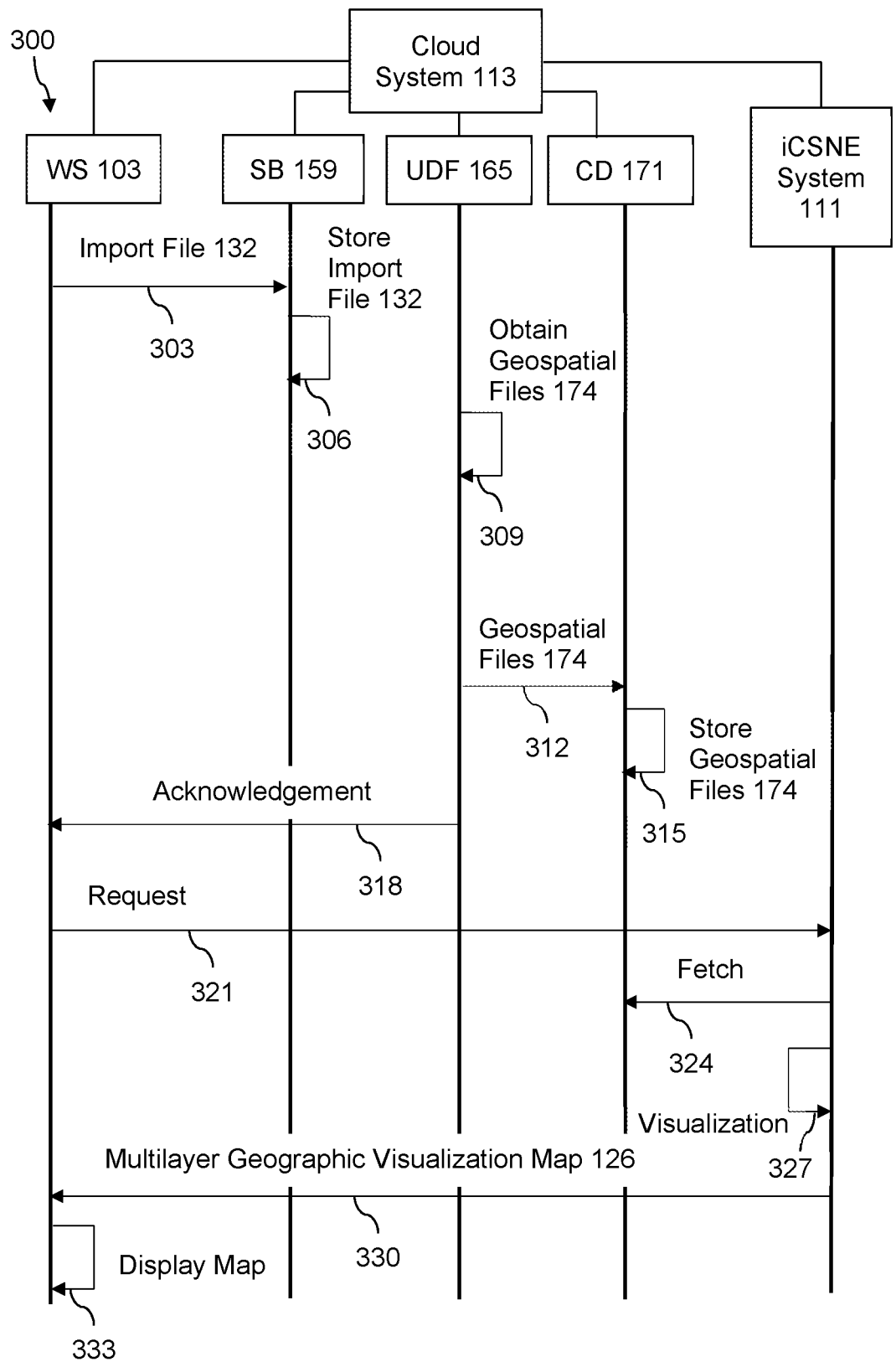
FIG. 3 is a message sequence diagram illustrating an example method performed by components in the communication system of FIG. 1 according to an embodiment of the disclosure.

Turning now to FIG. 3, shown is a message sequence diagram illustrating a method 300, performed by the workstation 103, the cloud system 113, and the iCSNE system 111. More specifically, the storage bucket 159, the UDF 165, and the cloud database 171 in the cloud system 113 may perform the steps of the cloud system 113 in method 300. In an embodiment, method 300 may be performed after an import file 132 has been obtained (e.g., generated at the workstation 103 or received by the workstation 103 from an external source).

At step 303, the workstation 103 may upload an import file 132 to the storage bucket 159 in a cloud system 113. The import file 132 may be a file type that is permitted to be used to create a multilayer geographic visualization 126. For example, a carrier technologist operating the workstation 103 may upload an import file 132 using the UE element 215 shown in the UI 123 of FIG. 2. For example, the workstation 103 may communicate with the cloud system 113 to upload the import file 132 via the cell site 114 and/or using a series of API calls using APIs 135 and 168.

At step 306, the storage bucket 159 may receive the import file 132 from the workstation 103, and store the import file 132 at the storage bucket 159. When the import file 132 is stored at the storage bucket 159, the UDF 165 may be triggered to execute. In an embodiment, the UDF 165 may be triggered to begin processing the import file 132 to obtain one or more geospatial files 174 at step 309. For example, the UDF 165 may obtain, or fetch, the import file 132 from the storage bucket 159, and use the import file 132 as an input into the UDF 165. The UDF 165 may then perform the processing to convert the import file 132 into the one or more geospatial files 174 using one or more geospatial libraries stored with the UDF 165. The UDF 165 may then output the one or more geospatial files 174. At step 312, the UDF 165 transmits the one or more geospatial files 174 to the cloud database 171 for storage. At step 315, the cloud database 171 receives the one or more geospatial files 174 and stores the one or more geospatial files 174.

When the cloud system 113 or the combination of the storage bucket 159, the UDF 165, and the cloud database 171 are stored in the same data center, the processing of steps 306, 309, 312, and 315 is vastly more efficient than prior techniques of layer importation. This may be because the storage bucket 159, the UDF 165, and the cloud database 171 are programmed to work together seamlessly with a very low latency, when the storage bucket 159, the UDF 165, and the cloud database 171 are stored in the same data center.

At step 318, the UDF 165 may transmit an acknowledgement back to the workstation 103 that sent the import file 132, indicating that the import file 132 has been successfully uploaded and is available for rendering into the multilayer geographic visualization 126. For example, the cloud system 113 may communicate with the workstation 103 to transmit the acknowledgement via the cell site 114 and/or using a series of API calls using APIs 135 and 168. At step 321, the workstation 103 may transmit a request to the iCSNE system 111 to render a multilayer geographic visualization 126 with the data from the import file 132 that has just been indicated as being available for rendering. For example, the workstation 103 may communicate with the iCSNE system 111 to transmit the request via the cell site 114 and/or using a series of API calls using APIs 135 and 156.

At step 324, the iCSNE application 150 at the iCSNE system 111 may retrieve or fetch the geospatial files 174 created from the import files 132 from the cloud database 171. For example, the iCSNE system 111 may communicate with the cloud system 113 to fetch the geospatial files 174 via the cell site 114 and/or using a series of API calls using APIs 156 and 168.

At step 327, a visualization application 153 at the iCSNE system 111 may process the geospatial files 174 to render the multilayer geographic visualization 126 in a human viewable visualization format. In another embodiment, the visualization application 153 may publish the geospatial files 174 into a geospatial server (i.e., transmit the geospatial files 174 to the geospatial server), such as GEOSERVER, such that the geospatial server renders the multilayer geographic visualization 126 in a human viewable visualization format.

In either case, at step 330, either the iCSNE system 111 or the geospatial server then sends the multilayer geographic visualization 126 to the workstation 103 for display at the workstation 103. At step 333, the workstation 103 may display the multilayer geographic visualization 126 on the UI 123, similar to that shown in FIG. 2.

Figure 4:
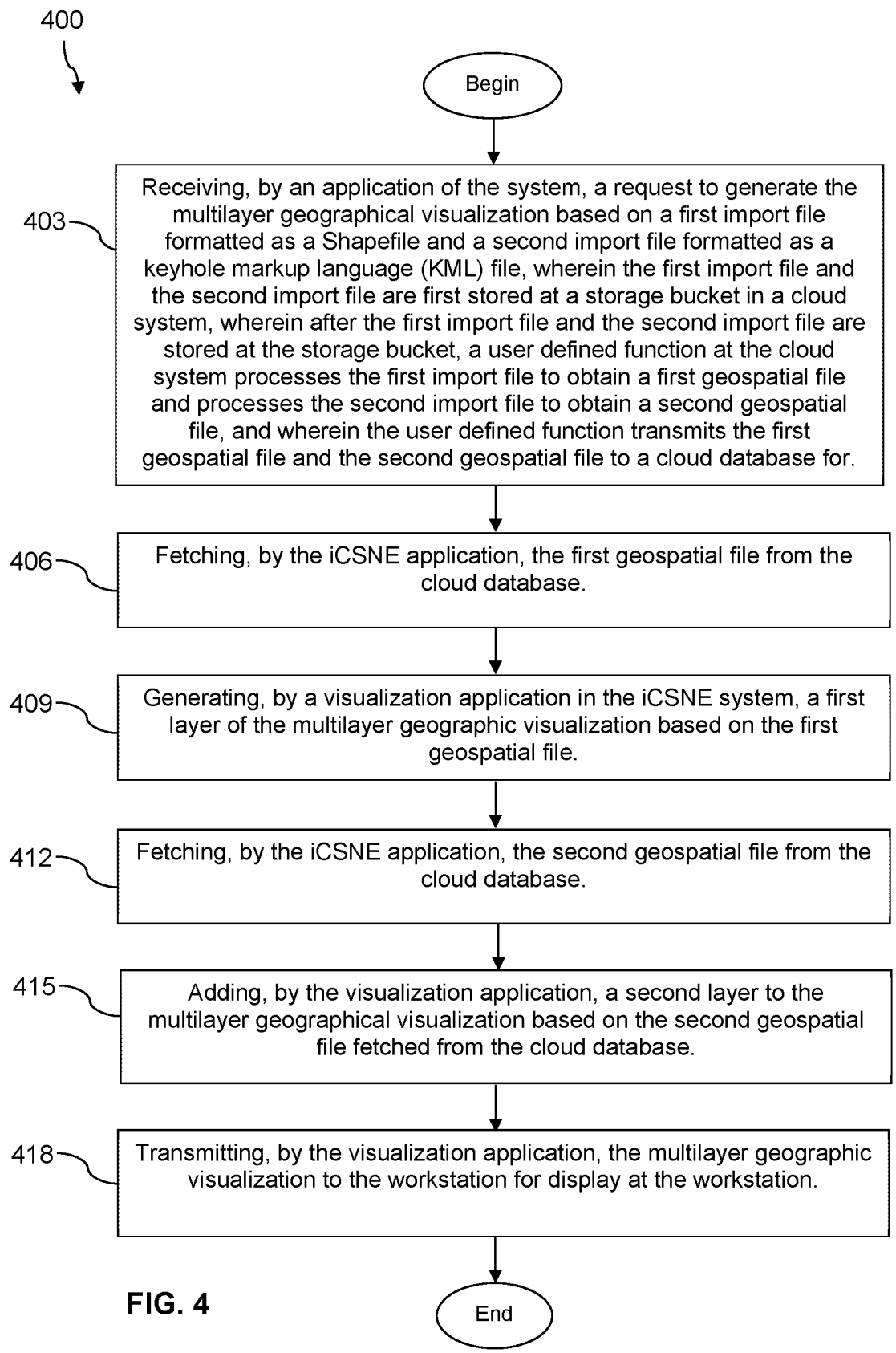
FIG. 4 is a flowchart of a first method according to an embodiment of the disclosure.

Turning now to FIG. 4, a method 400 is described. In an embodiment, method 400 may be performed the by iCSNE application 150 and the visualization application 153. In an embodiment, method 400 may be performed after the workstation 103 has obtained the import file 132, and the import file 132 has been uploaded to the cloud system 113.

At block 403, method 400 comprises receiving, by an iCSNE application 150 in the iCSNE system, a request to generate a multilayer geographic visualization 126 based on a first import file 132 formatted as a Shapefile and a second import file 132 formatted as a keyhole markup language (KML) file. The first import file 132 and the second import file 132 may be first stored at a storage bucket 159 in a cloud system 113. After the first import file 132 and the second import file 132 are stored at the storage bucket 159, a UDF 165 at the cloud system 113 processes the first import file 132 to obtain a first geospatial file 174 and processes the second import file 132 to obtain a second geospatial file 174. The UDF 165 transmits the first geospatial file 174 and the second geospatial file 174 to a cloud database 171 for storage.

At block 405, method 400 comprises fetching, by the iCSNE application 150, the first geospatial file 174 from the cloud database 171. This may involve the iCSNE application 150 requesting the cloud database 171 for the first geospatial file 174, and the cloud database 171 responding to the iCSNE application 150 with the geospatial file 174. At block 409, method 400 comprises generating, by the visualization application 153 in the iCSNE system 111, a first layer of the multilayer geographic visualization 126 based on the first geospatial file 174. At block 412, method 400 comprises fetching, by the iCSNE application 150, second geospatial file 174 from the cloud database 171. At block 415, method 400 comprises adding, by the visualization application 154, a second layer to the multilayer graphic visualization 126 based on the second geospatial file 174. At block 418, method 400 comprises transmitting, by the visualization application 153, the multilayer geographic visualization 126 to the workstation 103 for display at the workstation 103.

Figure 5:
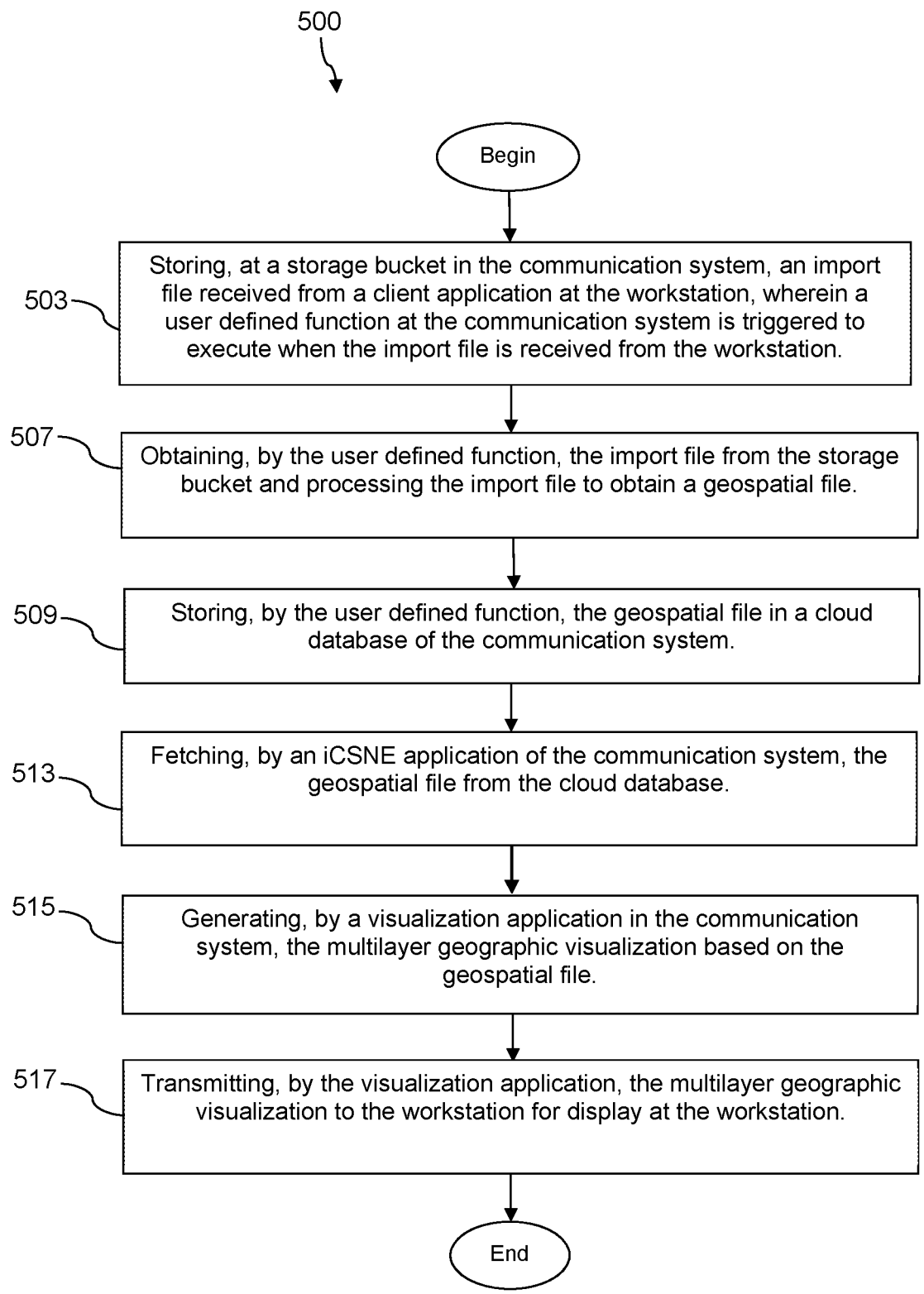
FIG. 5 is a flowchart of a second method according to an embodiment of the disclosure.

Turning now to FIG. 5, a method 500 is described. In an embodiment, method 500 may be performed by different components in the communications system 100 (e.g., the workstation 103, the cloud system 113, and the iCSNE system 111). In an embodiment, method 500 may be performed after the workstation 130 has obtained the import file 132.

At block 503, method 500 comprises storing, at a storage bucket 159 of the communications system 100, an import file 132 received from a client application 119 at the workstation 103. A UDF 165 at the communications system 100 may be trigger to execute when the import file 132 is received from the workstation 103.

At block 507, method 500 comprises obtaining, by the UDF 165, the import file 132 from the storage bucket 159 and processing the import file 132 to obtain a geospatial file 174. For example, the UDF 165 may convert the import file 132 into the geospatial file 174 using one or more geospatial libraries stored with the UDF 165. At block 509, method 500 comprises storing, by the UDF 165, the geospatial file 174 in the cloud database 171 of the communication system 100.

At block 513, method 500 comprises fetching, by the iCSNE application 150, the geospatial file 174 from the cloud database 171. This may involve the iCSNE application 150 requesting the cloud database 171 for the geospatial file 174, and the cloud database 171 responding to the iCSNE application 150 with the geospatial file 174. At block 515, method 500 comprises generating, by the visualization application 153 in the iCSNE system 111, the multilayer geographic visualization 126 based on the geospatial file 174. At block 517, method 500 comprises transmitting, by the visualization application 153, the multilayer geographic visualization 126 to the workstation 103 for display at the workstation 103.

Figure 6A:
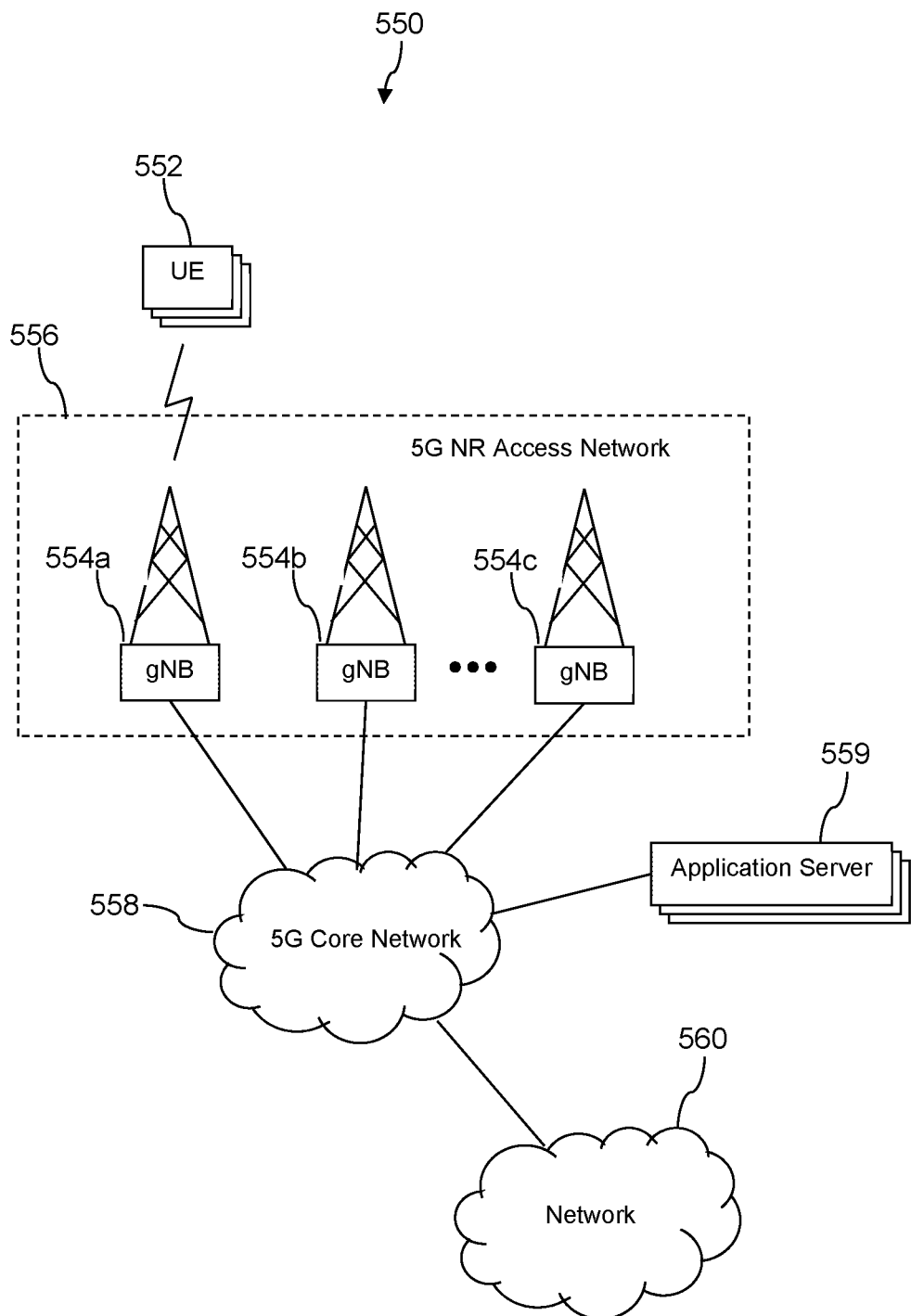
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the primary device 103 and secondary device 106, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
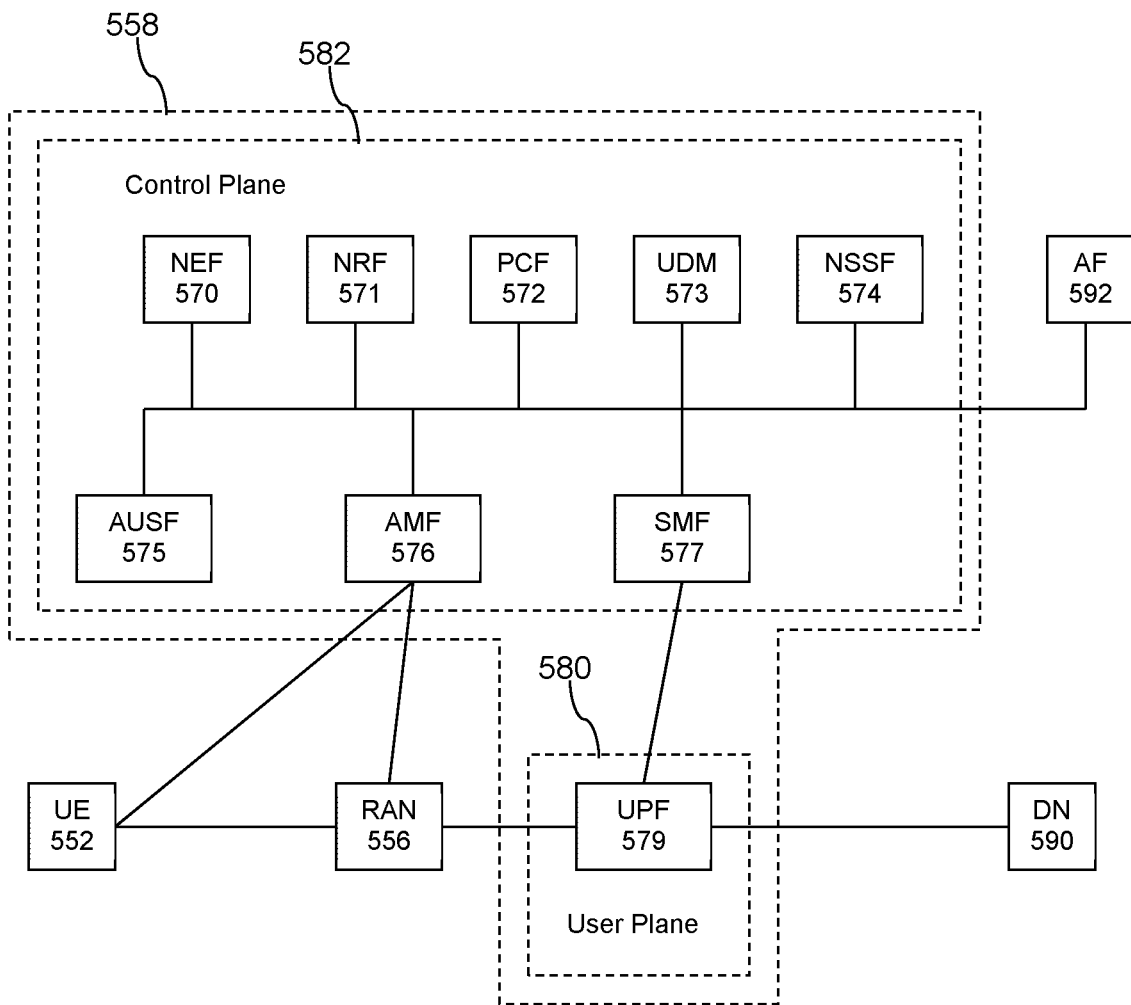

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
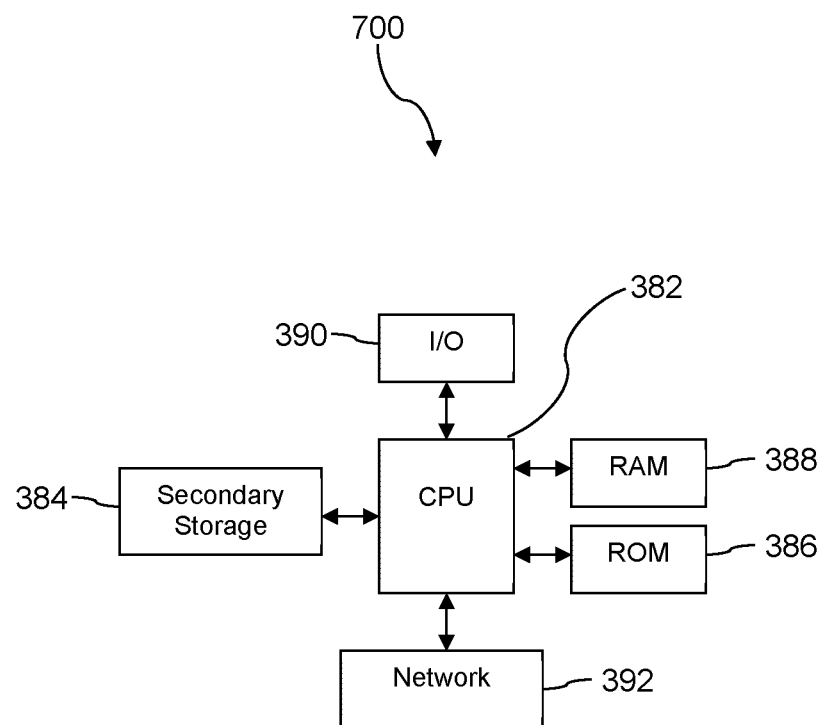
FIG. 7 is a block diagram of a computer system implemented within the communication system of FIG. 1 according to an embodiment of the disclosure.

FIG. 7 illustrates a computer system 700 suitable for implementing one or more embodiments disclosed herein. In an embodiment, the UE 102 and the workstation 103 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a system to generate a multilayer geographical virtualization, wherein the method comprises:
    receiving, by an application of the system, a request to generate the multilayer geographical virtualization based on a first import file received from a first user as multiple subfiles and a second import file received from a second user different from the first user and formatted as a keyhole markup language (KML) file, wherein the first import file and the second import file are first stored at a scalable storage bucket in a cloud system;
    responsive to receiving the request, performing processing, via a user defined function at the cloud system, to:
        process the subfiles to provide the first import file formatted as a Shapefile;
        process the first import file to obtain a first geospatial file by translating the first import file from a first file format to a third file format and normalizing data of the first import file appearing in the third file format, wherein the third file format is a common format for geospatial files;
        process the second import file to obtain a second geospatial file by translating the second import file from a second file format to the third file format and normalizing data of the second import file appearing in the third file format; and
        transmit the first geospatial file and the second geospatial file to a cloud database for storage;
    responsive to completion of the processing by the user defined function, fetching, by the application, the first geospatial file from the cloud database;
    generating, by a visualization application of the system, a first layer of the multilayer geographical virtualization based on the first geospatial file fetched from the cloud database;
    fetching, by the application, the second geospatial file from the cloud database;
    adding, by the visualization application, a second layer to the multilayer geographical virtualization based on the second geospatial file fetched from the cloud database; and
    transmitting, by the visualization application to a workstation, the multilayer geographical virtualization for display at the workstation.

2. The method of claim 1, wherein the first import file or the second import file comprises data related to a radio network coverage of a carrier network within a geographic area.

3. The method of claim 1, wherein the storage bucket, the user defined function, and the cloud database are included as part of the cloud system.

4. The method of claim 1, wherein generating, by the visualization application, the first layer of the multilayer geographical virtualization based on the first geospatial file fetched from the cloud database comprises processing, by the visualization application, the first geospatial file to render the multilayer geographical virtualization in a human viewable visualization format.

5. The method of claim 1, wherein generating, by the visualization application, the first layer of the multilayer geographical virtualization based on the first geospatial file fetched from the cloud database comprises transmitting, by the visualization application, the first geospatial file to a geospatial server, wherein the multilayer geographical virtualization is rendered into a human viewable visualization format.

6. The method of claim 1, further comprising storing the application and runtime environment for the application in a software container of the system.

7. The method of claim 1, wherein the multilayer geographical virtualization is generated based on network data received from network elements in a carrier network and radio data receive from devices registered with the carrier network.

8. A method performed by a communication system to generate a multilayer geographical virtualization, wherein the method comprises:
storing, at a scalable storage bucket of the communication system, multiple import files of different users received from a client application at a workstation, wherein a first import file of the multiple import files is received as multiple subfiles;
responsive to receiving the imported files from the workstation, executing a user defined function to process the imported files, the processing including:
processing, by the user defined function, the multiple subfiles to provide the first import file formatted as a Shapefile;
processing, by the user defined function, the first import file by translating the first import file from a first file format to a third file format and normalizing data of the first import file appearing in the third file format, wherein the third file format is a common format for geospatial files;
processing the second import file to obtain a second geospatial file by translating the second import file from a second file format to the third file format and normalizing data of the second import file appearing in the third file format; and
storing the first and second geospatial file-files in a cloud database of the communication system;
fetching, by an application of the communication system, the first and second geospatial files from the cloud database;
generating, by a visualization application of the communication system, the multilayer geographical virtualization based on the first and second geospatial file-files fetched from the cloud database; and
transmitting, by the visualization application to the workstation, the multilayer geographical virtualization for display at the workstation.

9. The method of claim 8, wherein processing, by the user defined function, the import file to obtain the first and second geospatial files comprises converting, by the user defined function, the first and second import imported files into the first and second geospatial files using a geospatial library.

10. The method of claim 8, wherein the communication system comprises a cloud system, and wherein the cloud system comprises the storage bucket, user defined function, and cloud database.

11. The method of claim 8, wherein after storing the geospatial file in the cloud database, the method further comprises transmitting, by the application to the workstation, an acknowledgment indicating that at least one of the first import file or the second import has been uploaded and is ready for rendering.

12. The method of claim 8, wherein at least one of the first imported file or the second imported file comprises data related to a radio network coverage of a carrier network within a geographic area.

13. The method of claim 8, further comprising storing the application and runtime environment for the application in a software container of the system.

14. The method of claim 8, wherein the multilayer geographical virtualization is generated based on network data received from network elements in a carrier network and radio data receive from devices registered with the carrier network.

15. A system comprising:
at least one processor;
at least one non-transitory memory;
a scalable storage bucket configured to store imported files including at least first and second import files of different sources received from a client application at a workstation, wherein the first import file is received as multiple subfiles;
a user defined function triggered to execute responsive to the imported files being received from the workstation, wherein the user defined function is stored in the at least one non-transitory memory, which when executed by the at least one processor, causes the at least one processor to be configured to:
retrieve the imported files from the scalable storage bucket;
process the multiple subfiles to provide the first import file formatted as a Shapefile;
process the first import file by translating the first import file from a first file format to a third file format and normalizing data of the first import file appearing in the third file format, wherein the third file format is a common format for geospatial files;
process the second import file to obtain a second geospatial file by translating the second import file from a second file format to the third file format and normalizing data of the second import file appearing in the third file format; and
store the geospatial files in a cloud database of the system;
an application stored in the at least one non-transitory memory, which when executed by the at least one processor, causes the at least one processor to be configured to fetch the geospatial files from the cloud database; and
a visualization application in the at least one non-transitory memory, which when executed by the at least one processor, causes the at least one processor to be configured to:
generate a multilayer geographical virtualization based on the geospatial files fetched from the cloud database; and
transmit the multilayer geographical virtualization for display at the workstation.

16. The system of claim 15, wherein the user defined function further causes the at least one processor to be configured to convert the imported files into the geospatial files using a geospatial library.

17. The system of claim 15, wherein the system further comprises a cloud system, and wherein the cloud system comprises the storage bucket, user defined function, and cloud database.

18. The system of claim 15, wherein the application further causes the at least one processor to be configured to transmit, to the workstation, an acknowledgment indicating that at least one of the imported files has been uploaded and is ready for rendering.

19. The system of claim 15, wherein at least one of the imported files comprises data related to a radio network coverage of a carrier network within a geographic area.

20. The system of claim 15, further comprising a software container configured to store the application and a runtime environment for the application.

\* \* \* \* \*